United States Patent [19]

Suzuki

[11] Patent Number: 4,965,141
[45] Date of Patent: Oct. 23, 1990

[54] ELECTRIC CELL HOUSING DEVICE FOR CAMERA

[75] Inventor: Shinichi Suzuki, Tokyo, Japan
[73] Assignee: Nikon Corporation, Tokyo, Japan
[21] Appl. No.: 431,210
[22] Filed: Nov. 3, 1989
[30] Foreign Application Priority Data Nov. 7, 1988 [JP] Japan .............. 63-144384[U]
Nov. 7, 1988 [JP] Japan .............. 63-144385[U]

[51] Int. Cl.⁵ .............................. H01M 2/02
[52] U.S. Cl. ........................ 429/9; 429/99; 429/100
[58] Field of Search ............... 429/9, 96–100, 429/163, 176; 439/500

[56] References Cited

U.S. PATENT DOCUMENTS

| | | | |
|---|---|---|---|
| 3,782,814 | 1/1974 | Greenblatt | 429/99 X |
| 3,943,537 | 3/1976 | Lange | 429/98 X |
| 4,057,677 | 11/1977 | Mabuchi | 429/100 |
| 4,397,920 | 8/1983 | Trattner | 429/100 |
| 4,767,358 | 8/1988 | Nullmeyer et al. | 429/100 |
| 4,828,944 | 5/1989 | Yabe et al. | 429/97 |
| 4,853,302 | 8/1989 | Yamanaka et al. | 429/99 |
| 4,880,712 | 11/1989 | Gordecki | 429/97 |

FOREIGN PATENT DOCUMENTS 62-23061 2/1987 Japan .

Primary Examiner—Anthony Skapars
Attorney, Agent, or Firm—Shapiro and Shapiro

[57] ABSTRACT

A cell housing device for a camera has a housing chamber defined in a camera body and capable of housing therein one of two types of cells different in shape and comprising a first housing portion which are defined by first side walls and has a cross section and depth adapted to house therein a second cell relatively greater in diameter and short and a second housing portion which is further extended downwardly from said first housing portion and is defined by second side walls and has a cross section and depth adapted to house therein the lower portion of a first cell which is longer than the second cell. Furthermore the cell housing device is provided with a cover capable of opening or closing the cell insertion opening of said housing chamber, elastic means for pressing against the inserted cell toward the cover, means extended from the inner wall of the housing chamber in the vicinity of the cell insertion opening thereof and capable of temporarily engaging with the edge of the upper end surface of the inserted cell against the biasing forces of the elastic means and means extended inwardly from the lower surface of the cover for releasing the engagement of the inserted cell with the first mentioned means in response to the operation for closing the cover.

11 Claims, 3 Drawing Sheets 4,965,141

ELECTRIC CELL HOUSING DEVICE FOR CAMERA

BACKGROUND OF THE INVENTION

1. Field of the Invention

The present invention relates to an electric cell housing chamber for a camera and more particularly an electric cell housing device adapted to two types of cells which are different in size.

2. Related Background Art

Recently the automation of cameras such as the automatic exposure adjustment, the automatic focusing, the automatic film feeding and so on has advanced and an electronic flash is incorporated in an camera so that various electric devices which consume large electric power are incorporated in the camera. Therefore, the lithium cells having a high electric capacity are now used.

The lithium cells are generally divided into two types according to their outer shapes and the positions of a pair of electrodes. However when an electric cell housing chamber is so designed and constructed for housing only one type cell or when the the cell housing chamber has electric contacts adapted only to eastablish electrical contacts with a predetermined pair of electrodes of the cell, it is very inconvenient because the different types of cells cannot be used.

In order to solve the problem described above, Japanese Laid-Open Utility Model Application No. 62-23061 discloses a camera whose cell housing chamber is so designed and constructed to house one of the electric cells which are different in shape and which has a cover which has two pairs of electric contacts adapted to make electic contacts with two pairs of electrodes of the electric cells whose positions are different from each other.

In this case, wires must extended to a cell cover which is opened and closed in such a way that the wires must not hinder the opening or closing operation of the cell cover. Furthermore, when the opening or closing operation of the cell cover is repeated many times, there is a possibility of breaking of wires. Thus from the standpoint of reliability and durability, the camera of the type described above is no satisfactory in practice.

SUMMARY OF THE INVENTION

In view of the above, one of the objects of the present invention is to provide a cell housing chamber for a camera into which any electric cell different in shape can be stored.

Another object of the present invention is to provide an electric cell chamber for camera which enables to reduce the number of component parts and improves reliability and durability.

To the above and other ends, a cell housing device for a camera in accordance with the present invention, has a housing chamber defined in a camera body and capable of housing therein one of two types of cells different in shape and comprising a first housing portion which are defined by first side walls and has a cross section and depth adapted to house therein a second cell relatively greater in diameter and short and a second housing portion which is further extended downwardly from said first housing portion and is defined by second side walls and has a cross section and depth adapted to house therein the lower portion of a first cell which is longer than said second cell. Furthermore the cell housing device is provided with a cover capable of opening or closing the cell insertion opening of said housing chamber, elastic means for pressing against the inserted cell toward said cover, means extended from the inner wall of said housing chamber in the vicinity of said cell insertion opening thereof and capable of temporarily engaging with the edge of the upper end surface of the inserted cell against the biasing forces of said elastic means and means extended inwardly from the lower surface of said cover for releasing the engagement of the inserted cell with said first mentioned means in response to the operation for closing said cover.

Therefore, when one cell is inserted into the housing chamber against the biasing forces of elastic means, it is engaged with and clamped by engaging means so that it becomes possible to close the cover without encountering any resistance. Furthermore, when the cover is closed, disengaging means releases the engagement of the inserted cell with the engaging means so that when the cover is opened, one portion of the inserted cell is automatically pushed out of the housing chamber under the biasing forces of elastic means so that the inserted cell can be pulled out of the cell housing chamber very easily.

Furthermore, a cell housing device for a camera in accordance with the present invention is provided with a housing chamber defined in a camera body and adapted to house therein selectively one of a plurality of types of electric cells different at least in length each of which has electrodes or terminals spaced apart from each other by a different distance, and electric contact means comprising contact means capable of contact with the electrodes or terminals of one of a plurality types of electric cells inserted in the housing chamber, contact supporting means which support said contact means and are displaced over a distance corresponding to the length of the inserted cell in response to the insertion thereof so as to displace said contact means to the positions of the electrodes or terminals, respectively of the inserted cell and elastic spring means for forcibly contact said contact means against their corresponding electrodes or terminals, respectively, through said contact supporting means, whereby even when the positions of the electrodes or terminals of the inserted cell are different, the positive electric contacts between the contact means of said electric contact means and the terminals or electrodes of the inserted cell can be ensured.

The above and other objects, effects, features and advantages of the present invention will become more apparent from the following description of a preferred embodiment thereof taken in conjunction with the accompanying drawings.

DESCRIPTION OF THE PREFERRED EMBODIMENTS

Referring now to the accompanying drawings, the present invention will be described in detail hereinafter.

Figure 1:
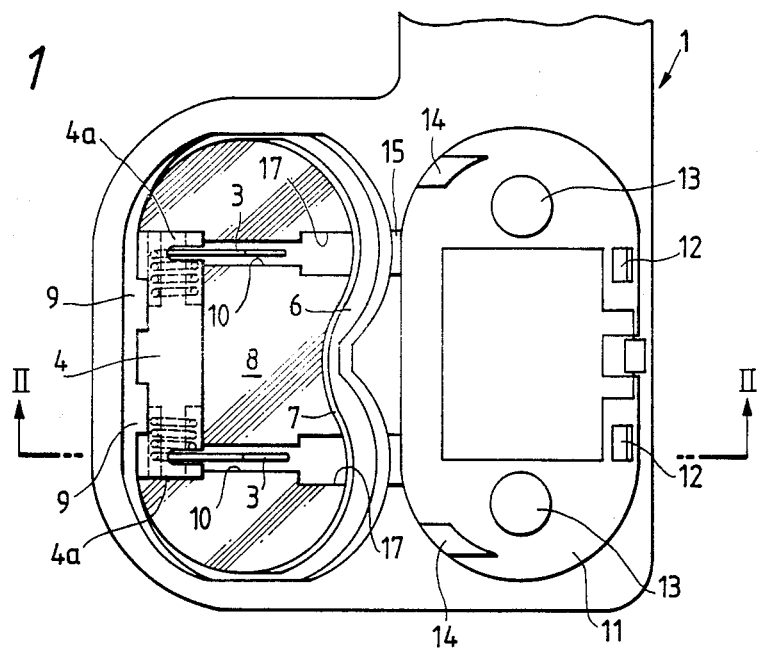
FIG. 1 is a top view of an electric cell housing device for a camera with a cell cover opened in accordance with the present invention.
Figure 2:
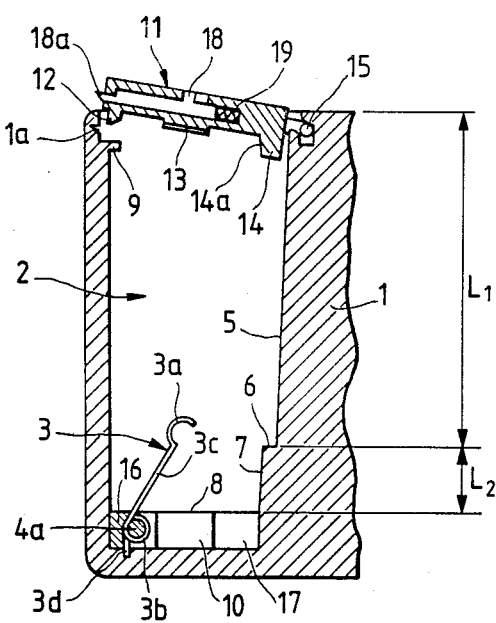
FIG. 2 is a sectional view taken along the line II—II of FIG. 1 illustrating that the cell cover is slightly opened.
Figure 7:
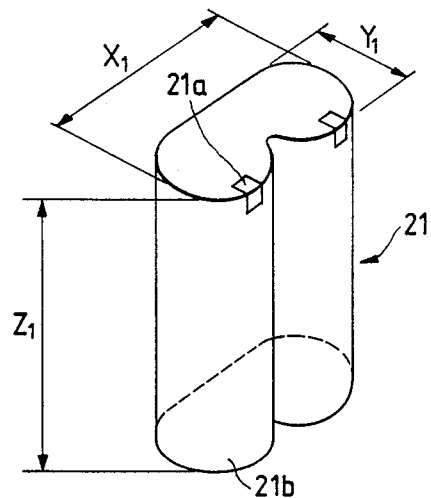
FIG. 7 is a perspective view of the first electric cell.
Figure 8:
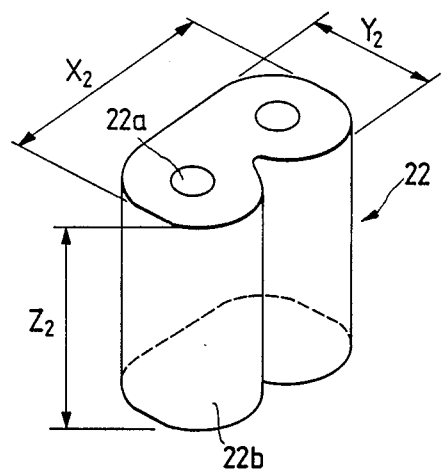
FIG. 8 is a perspective view of the second electric cell.

First referring to FIGS. 1 and 2, an electric cell housing chamber 2 is defined within a grip of a camera body 1 (which is partially shown) and one of two types of lithium cells 21 and 22 shown in FIGS. 7 and 8, respectively, can be housed in the housing chamber 2.

The lithium cells 21 and 22 are different in outer size and positions of contacts from each other as shown in FIGS. 7 and 8. More particularly, when the width, thickness and height of the first cell 21 are represented by $X_1$, $Y_1$ and $Z_1$, respectively, and when the width, thickness and height of the second cell 22 are indicated by $X_2$, $Y_2$ and $Z_2$, respectively, they have the following relations:

$$X_1 < X_2$$

$$Y_1 < Y_2 \text{ and}$$

$$Z_1 > Z_2.$$

Thus the first electric cell 21 is constructed to have a smaller sectional area and an elongated height while the second cell 22 is constructed to have a relatively larger cross section and short in height.

Now referring particularly to FIG. 2, the cell housing 2 has a cross section substantially similar that of the second cell 22 from the open end surface to the depth $L_1$ and the portion $L_2$ from the depth $L_1$ to the bottom B has a cross section substantially similar to that of the first cell 21. In other words, in the portion extended from the open end surface to the depth $L_1$, the distance between the opposing wall of the housing chamber 2 is relatively longer while the portion from the depth $L_1$ to the bottom B, relatively shorter. The height or length $Z_2$ of the second cell 22 is slightly shorter than the depth $L_1$ while the height or length $Z_1$ is considerably longer than the depth $L_1$. Furthermore, the height or length $Z_1$ of the first cell 21 is slightly shorter than the whole depth of the housing chamber 2 ($L_1 + L_2$). A stepped portion 6 is thus defined at the depth $L_1$ from the open end surface of the cell housing chamber 2 so that even when the second cell 22 is pushed into the housing chamber 2 under strong force, the bottom of the second cell 22 can be prevented from being further inserted beyond the step 6.

A projection 9 is extended inwardly from the inner wall in the vicinity of the open end of the cell housing chamber 2. Therefore in order to house two types of the first and second lithium cells 21 and 22 into the housing chamber 2 without being hindered by the projection 9, a first side wall or side wall surface 5 of the housing chamber 2 is slightly tapered and a second side wall or side surface 7 is also tapered so as to facilitate the insertion of the first lithium cell 21.

At the bottom of the cell housing chamber 2, a member 4 having shafts 4a at both ends is securely and integrally fixed to the camera body. Each shaft 4a carries one torsion spring 3 each consisting of an arcuate contact portion 3a, a rod portion 3c and elastic means or coil portion 3b. The member 4 has an engagement portion 16 for engaging with one end 3d of the coiled spring and limiting the displacement in the counterclockwise direction of the rod portion 3c. The torsion spring 3 is used as a contact spring which contacts with one of the cells 21 and 22 and also used for supporting the inserted cell 21 or 22. One of the torsion coils 3 are used as a plus electric contact (+) while the other, as a minus electric contact (−). They are spaced apart from each other by a suitable distance and electrically isolated from each other. The two torsion springs 3 are so designed and constructed that one of them is wound in the clockwise direction while the other, in the counterclockwise direction. One end 3d of each torsion spring 3 is engaged with the engagement member 16 described above. It follows therefore when the external force is imparted to the other end or rod portion 3c, the torsion spring 3 can store the biasing force without causing the rotation of the one end 3d of the torsion spring 3. One end of a wire (not shown) extended from the camera body 1 is connected to one coiled spring 3 while one end of a wire extended from the camera body is connected to the other coiled spring and the other ends of the wires are connected to electric devices (not shown) incorporated in the camera body 1.

At the bottom of the cell housing chamber 2 are defined grooves 10 and 17 which are extended in the direction of the projection on a horizontal plane of the rod portion 3c of the torsion spring 3. When the bottom of the elongated cell 21 presses down the contact portion 3a of the torsion spring 3, the rod portion 3c is caused displace itself in the clockwise direction. The grooves 10 and 17 are provided so that the rod portion 3c is pressed downwardly along the surface substantially vertical to the shaft 4c guided by the grooves 10 and 17. The groove 17 is slightly greater in width than the groove 10. The projection 9 in the vicinity of the cell insertion opening of the cell housing chamber 2 is provided in order to facilitate the insertion of the first electric cell 21 as will be described in detail hereinafter.

The biasing force of the torsion coil 3 in accordance with the present invention is weakest in the condition shown in FIG. 2 and the biasing force is gradually increased as the rod portion 3c is forced to go down. The torsion spring 3 also serves to support one of the two types of the cells 21 and 22. Therefore when the biasing force of the torsion coil 3 is weak, it cannot support the incerted cell securely, causing the vertical displacement of the cell in the cell housing chamber 2; that is, the play thereof. As a result, the secure electrical contacts between the arcuate contact portions 3c of the torsion springs 3 on the one hand and the positive and negative terminals of the electric cell cannot be ensured sometimes. It follows therefore that it is necessary that the biasing force of the torsion spring 3 is always maintained above a predetermined level. To this end, according to the present invention, under the condition that the short second electric cell 22 is housed within the cell housing chamber 2, the angle between the rod portion 3c and the bottom 8 is taken into consideration to determine the biasing force of the torsion spring 3 at a suitable level.

However, when the biasing force is satisfactory under the above-described condition and when the longer first cell 21 is inserted into the cell housing chamber 2, the rod portion 3 is considerably displaced in the clockwise direction so that the biasing force of the torsion spring 3 becomes excessive. In this case, the biasing force is not so strong as to prevent the insertion of the cell 21, but a problem arises when the operation of closing the cell cover 11 and the operation of inserting the first lithium cell 21 are simultaneously carried out. However, according to the present invention, the projection 9 is extended. Therefore the first electric cell 21 is inserted into the cell housing chamber 2 and pushed it toward its housed position against the biasing force of the torsion spring 3 and then the edge of the upper surface of the first electric cell 21 is forced to engage with the projection 9 so that the first cell 21 can be maintained at its housed position against the biasing force of the torsion spring 3. Thereafter the cell cover 11 can be closed easily. The above-described function is especially effective when the insertion of an electric cell into the cell housing chamber 2 must be made only by one hand. In the case of the insertion of the short second cell 22, since the biasing force of the torsion spring 3 is relatively weak so that it is not necessary to force the upper edge of the electric cell 22 to engage with the projection. However, if the biasing force of the torsion spring 3 is further increased, it is better to force the edge of the upper surface of the cell 22 to engage with the projection 9.

The cover 11 is pivoted to a hinge 15 in such a way that the cover 11 is rotatable through 100°. A clamping pawl 18 and its biasing spring 19 are slidably disposed within the cover 11. As the clamping pawl 18 is slidingly displaced, its outer end 18a is extended beyond or retracted into the cover 11. When the clamping pawl 18 is displaced against the force of the biasing spring 19, the outer end 18a thereof is retracted into the cover 11 so that the cover 11 can be closed. When the cover 11 is completely closed, the outer end 18a of the clamping pawl 18 engages with an engaging hole 1a of the camera body 1 so that the closing of the cover 11 is accomplished. In the case of opening the cover 11, the clamping pawl 18 is displaced so as to disengage its outer end 18a from the engaging hole 1a, whereby the cover 11 is opened. When force is further exerted to the cover 11 maintained in its opened position, the hinge 15 is detached from the camera body 1 so that the breakdown of the hinge 15 is prevented.

Three projections, 12, 13 and 14 are extended inwardly from the lower surface of the cover 11 as will be described in detail hereinafter. First, two right and left engaging projections which are positioning means are extended inwardly from the positions in the vicinity of the hinges 15, respectively, as shown in FIG. 1. When the cover 11 is closed after the insertion of the second cell 22, the engaging projections 14 engage with the end surface 22b of the second electric cell 22 so that the cell 22 is further inserted into the cell housing chamber 2 against the force of the torsion springs 3.

It must be noted here that the engaging projections 14 are made into contact with the end surface of the shorter second cell 22, but in the case of the insertion of the longer first cell 21 into the cell housing chamber 2, the engaging projections 14 are out of contact with the end surface of the cell 21. The function of the engaging projections will be described below. Both the cells 21 and 22 are commercially available and their shapes and the distance between the terminals or electrodes are predetermined, but the contact portions 3a of the torsion springs 3 which are selectively made into contact with the terminals or electrodes, respectively, of both the electric cells. Furthermore the length of the rod portion 3c of each torsion spring 3 is limited because of the available space in the cell housing chamber 2. It follows therefore that only when each contact portion 3a is displaced about the shaft 4a along a predetermined arc, the electric connection is established for the time being, but it cannot be ensured that the electric connection with a high degree of reliability can be established. In order to establish the reliable electric connection, it is necessary that the shape of the torsion springs 3 must be varied in such a way that, for instance, the length of the rod portion 3c is varied or that the housed position of a cell is displaced in the direction of the thickness of the cell. According to the present invention, from the standpoint of economy, the housed position of a cell is displaced to the right or left in FIG. 1. Therefore when the cover 11 is closed after the insertion of the short second cell 22, the latter is further pushed downwardly by the engaging projections 14 so that the upper end surface of the cell 22 inserted is slightly lower than the upper end surface of the long first cell 21 when inserted into the cell housing chamber 2. Under the above condition, an electrode or terminal 22a of the second cell 22 is made into contact with the contact portion 3a of the torsion spring 3. As a result, the torsion springs 3 may be used in common and the reliable electric connection can be ensured.

Figure 4:
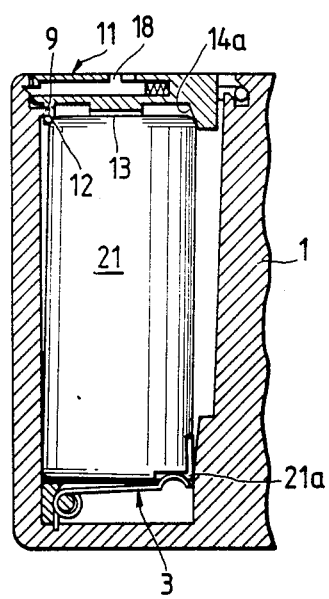
FIG. 4 is a longitudinal sectional view of the cell housing chamber housing therein the first electric cell with a cell cover being in the closed position.

In general, the electric cell housing chambers capable of housing one of the cells different in shape have an interior shape adapted to snugly house therein a certain cell, but not adapted to snugly house another cell, leaving play between the another cell and the inner wall surfaces of the chamber. Even in accordance with the present invention, the long first cell 21 is not adapted to make intimate contact with the inner wall surface of the upper portion of the cell housing chamber 2 so that there is a fear that play occurs in the right and left directions in FIG. 1. In order to solve this problem, according to the present invention, each engaging projection 14 has a tapered surface 14a as shown in FIG. 2. And as best shown in FIG. 4, when the cover 11 is closed, the tapered surface 14a is made into engagement with the peripheral edge of the upper surface of the long first cell 21 so that play of the cell 21 can be prevented.

Furthermore, according to the present invention, as best shown in FIG. 1, two engaging projections 13 each with a flat top surface are extended from the lower surface of the cover 11. When the long first cell 21 is inserted into the cell housing chamber 2 and the cover 11 is closed, the insertion opening of the cell housing chamber 2 is larger in size than the first cell 21. Therefore, a plate with a high degree of coefficient of friction such as a rubber plate is bonded to the outer surface of each engaging projection 13 so that play of the first cell 21 is prevented by the frictional force produced between the cover 11 and the first cell 21.

Figure 3:
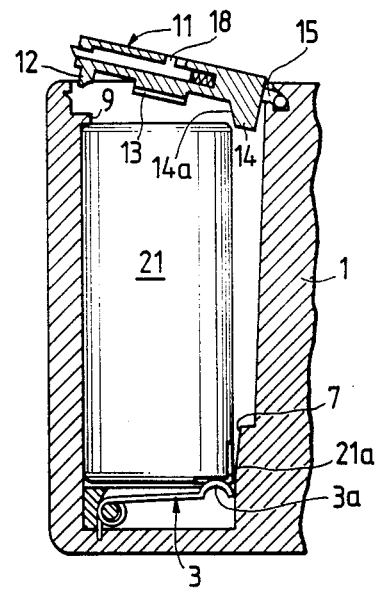
FIG. 3 is a longitudinal sectional view of the cell housing chamber housing a first electric cell with the cell cover being slightly opened.

The torsion springs 3 are also used as supporting members for supporting the bottom of the cell inserted into the cell housing chamber 2, but since the biasing force of the torsion springs 3 is greater, it hinders the smooth insertion of the long first cell 21 into the cell housing chamber 2. In order to solve this problem, according to the present invention, the projection 9 is extended as described above so as to facilitate the insertion of the first or second cell into the cell housing chamber 2. But the excessive biasing force of the torsion springs 3 causes another problem. That is, as best shown in FIG. 3, when the cover 11 is opened when the first cell 21 is housed within the cell housing chamber 2, it engages with the projection 9 so that it becomes impossible to remove the cell 21. When impact is exerted to the camera body 1 under this condition, the first cell 21 is suddenly disengaged from the projection 9 and is projected outwardly under the excessive force of the torsion springs 3. Therefore there is a fear that the suddenly projected cell 21 strikes against and injures the face of a photographer.

In order to encounter this problem, according to the present invention, as best shown in FIG. 2, the disengagement projections 12 each having an tapered outer surface are extended downwardly from the lower surface of the cover 11 in opposing relationship with the hinges 15, respectively. When the first cell 21 is housed within the cell housing chamber 2 and the cover 11 is closed, the disengaging projections 12 serve as disengaging means for disengaging the first cell 21 from the projection 9 of the camera body 1 as best shown in FIG. 4. It follows therefore that when the cover 11 is closed after the insertion of the first cell 21 into the cell housing chamber 2, the tapered surface of the disengagement projection 12 is made into contact with the upper end edge of the first cell 21 so that the latter is disengaged from the projection 9. Furthermore, the outer tapered surfaces of the disengagement projections 12 has a function for facilitating the disengagement projection 12 to be inserted in the space defined by the inner wall surface of the cell housing chamber 2 and the first or second cell inserted therein.

Even when the biasing forces from the torsion springs 3 are exerted to the cover 11 through the first cell 21, the cover 11 is prevented from being expectedly opened because the outer end 18a of the clamping pawl 18 is in engagement with the engagement hole 1a of the camera body 1. When the cover 11 is opened, the first cell 21 is forced to be simultaneously pushed out of the cell housing chamber 2 under the forces of the torsion springs 3, but the cover 11 is hindered by the cover 11 so that it is prevented from forcibly projecting out of the cell house chamber 2. When the cover 11 is opened while the projection remains in engagement with the upper end edge of the first cell 21, the latter is not immediately pushed out of the cell housing chamber 2, but because of the provision of the disengagement projections 12, the engagement of the projection 9 with the first cell 21 is already released when the cover 11 is closed. As a result, when the cover 11 is opened, the first cell 21 is pushed out of the cell housing chamber 2 to such an extent that a photographer can hold it. Thus the replacement of the old cell 21 by a new first cell can be carried out very smoothly.

Next the functions of the cell housing chamber 2 when one of the two types of cells 21 and 22 is inserted into the housing chamber 2 will be described.

Referring first to FIG. 3, the first cell 21 is inserted through the upper cell insertion opening into the cell housing chamber 2 against the biasing forces of the torsion springs 3 and is pushed further into the cell housing chamber 2 until the upper end surface of the first cell 21 is made into engagement with the projection 9. In this case, the rod portion 3c of each torsion spring 3 is forced to displace itself to a substantially horizontal position as shown in FIG. 3 from its free or upper position shown in FIG. 2. Furthermore the contact portions 3a of the torsion springs 3 are pressed by the electrodes or terminals of the first electric cell 21 to establish the electrical connection between the torsion spring 3 and the first cell 21 and simultaneously the torsion springs 3 are forced to store the biasing energy. The lower side surfaces of the first cell 21 are made into contact with the side surfaces 7 of the cell housing chamber 2 because the housing portion for housing therein the first cell 21 of the cell housing chamber 2 is substantially similar in shape to the first cell 21 so that play of the lower portion of the first cell 21 is prevented.

Referring next to FIG. 4, when the cover 11 is closed, the tapered surfaces of the disengagement projections 12 are made into engagement with the edge of the upper end surface of the first cell 21 so that the engagement of the projection 9 with the edge of the upper end surface of the first cell 21 is released. Furthermore the engaging projections 13 extended from the lower surface of the cover 11 are pressed against the upper end surface of the first cell 21 and the tapered surface 14a of the engaging projection 14 of the cover 11 is pressed against the edge of the upper end surface of the first cell 21. As a result, the displacement of the upper portion of the first cell 21 is limited, whereby play thereof can be prevented.

Figure 5:
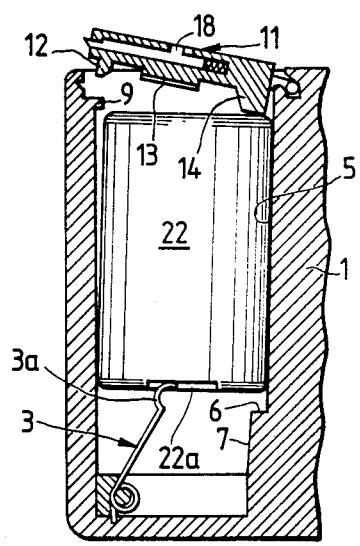
FIG. 5 is a longitudinal sectional view of the electric cell housing chamber housing therein a second electric cell with the cell cover being slightly opened.
Figure 6:
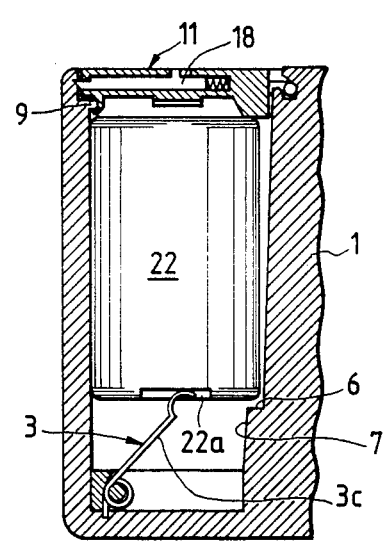
FIG. 6 is a longitudinal sectional view of the housing chamber housing therein the second cell with the cell cover closed.

Referring next to FIG. 5, the second cell 22 is inserted into the cell housing chamber 2 through the upper cell insertion opening thereof. When the cover 11 is closed, the engagement projection 14 presses the upper surface of the second cell 22 against the biasing forces of the torsion springs 3 so that the upper surface of the second cell 22 is disposed at the position lower than the projection 9. The electrodes or terminals at the lower surface of the second cell 22 press against the contact portions 3a of the torsion springs 3 so that the electrical connection is established between the second cell 22 and the torsion springs 3. Furthermore, as best shown in FIG. 6, the second cell 22 presses the rod portions 3c of the torsion springs 3 in the clockwise direction so that the torsion springs 3 impart the biasing forces to the second cell 22. Therefore, the failure of the electrical connection between the contact portions 3a of the torsion springs 3 on the one hand and the electrodes or terminals of the second cell 22 on the other hand which is caused by, for instance, vibration imparted to the cell housing chamber 2 or the camera body 1 can be prevented. Thus the second cell 22 can be securely maintained at its housed position. In this case, the biasing forces of the torsion springs are not needed to be increased greatly and the lower surface of the second cell 21 relatively weakly presses against the torsion springs 3 in such a way that the rod portions 3c of the torsion springs 3 are slightly angularly displaced from their initial or free positions. Furthermore the sides surfaces of the second cell 22 snugly mate with the side surfaces 5 of the cell housing chamber 2 which are so designed and constructed to permit the intimate contact between the side surfaces of the second cell 22 and the side surfaces 5 of the cell housing chamber 2. As a result, play or displacement to the right or left of the second cell 22 can be prevented. In FIG. 6, when the cover 11 is closed, the engagement projections 14 are made into contact with the upper surface of the cell 22 so that the upper portion of the second cell 22 is securely clamped and consequently upward or downward play or displacement of the second cell 22 can be prevented.

So far one preferred embodiment of the present invention has been described in detail, but it is to be understood that the present invention is not limited to the above-described embodiment only and that various modifications can be effected. For instance, the embodiment of the present invention has been described as having two projections 9 even though only one projection has been described in detail because they are substantially similar in construction and mode of operation, but one or more projections 9 may be provided as needs demand if a suitable space is available. Furthermore, the embodiment of the present invention has been described to use two types of commercially available electric cells each of which has electrodes or terminals spaced apart from each other by a different distance. Therefore according to the above-described embodiment of the present invention, in the case of the insertion of one of the two types cells, its electrodes or terminals are displaced to the suitable positions in the vertical direction and made into contact with the contact portions 3a of the torsion causing the contact portions 3a to draw arcs, respectively. Furthermore instead of extending the engagement projection 14 from the lower surface of the cover 11, a following alternative modification can be effected. That is, the rod portion 3c of each torsion springs 3 is slightly extended and the second side surface 7 of the cell housing chamber 2 is notched at the position to which the rod portion 3c is extended. A further modification is such that the rod portion 3c is slightly extended and the shaft 4a is further spaced part by a suitable distance in the direction opposite to the second side wall 7. Furthermore, the angle of inclination of the second side wall 7 is increased and the step 6 between the first and second side walls 5 and 7 can be eliminated. The above-described modifications can also attain the effects and features of the above-described embodiment.

The cell housing chamber for a camera in accordance with the present invention described in detail with reference to the accompanying drawings, is provided with
the contact portions which are pressed by one of the cells which is inserted to its housed position in the cell housing chamber and which are displaced to the positions of the electrodes or terminals of the inserted cell depending upon the length thereof and
the electric contact members each comprising elastic means which cause the contact portions against the cell inserted into the cell housing chamber and produce the elastic forces for supporting the inserted cell.

It follows therefore that even when one of the electric cells whose electrodes or terminals are spaced apart from each other by different distances, the reliable electrical contacts between the contact portions and their corresponding electrodes or terminals of the inserted cell can be ensured.

In addition, the above-described embodiment of the present invention is provided with
one or more projections in the vicinity of the cell insertion opening of the cell housing are extended inwardly from the inner walls thereof so as to engage with the periphery of the inserted cell and
the projection which is extended from the lower surface of the cover so as to disengage the inserted cell and is displaced so as to engage with the edge (of the upper surface) of the inserted cell so as to cause the displacement of the inserted cell widthwise when the cover is closed.

It follows therefore that when a cell is pushed into the cell housing chamber against the biasing forces of elastic means so as to engage the cell with the one or more projections in the vicinity of the cell insertion opening of the cell housing chamber. As a result, the cover can be closed without encountering any resistance and the projection extended from the lower surface of the cover releases the engagement of the inserted cell and one or more projections in the vicinity of the cell insertion opening of the cell housing chamber when the cover is closed. When the cover is opened, the inserted cell can be pushed away from the cell housing chamber without being hindered by or engaged with one or more projections in the vicinity of the cell insertion opening of the cell housing chamber.

What is claimed is:

1. A cell housing device capable of selectively housing a first cell relatively longer in length and elongated in the longitudinal direction or a second electric cell relatively greater in diameter and shorter in length, comprising:
   a housing chamber provided with an opening through which said first or second cell is inserted, and comprising a first housing portion having a depth sufficient to house said first cell and a relatively large cross sectional size corresponding to said second cell and a second housing portion being defined integral with said first housing portion and having a depth and a relatively small cross sectional size sufficient to house therein a portion of said first cell;
   a cover for closing or opening of said housing chamber;
   elastic means for biasing said first or second cell inserted into said housing chamber toward to said opening;
   engaging means which is extended inwardly into said opening of said housing chamber and temporarily engage one edge of the inserted cell against the biasing forces of said elastic means; and
   disengaging means provided on said cover and capable of releasing said temporary engagement of said engaging means with said inserted cell in response to the closing action of said cover.

2. A cell housing device for a camera as set forth in claim 1, wherein said disengaging means includes a projection which is extended inwardly from the lower surface of said cover and is capable of engaging with said one edge of said cell and is inserted between said cell and the side walls of said housing chamber when said cover is closed so as to displace said one edge of said cell in the direction in which said cell is pushed out.

3. A cell housing device as set forth in claim 2, wherein said projection of said disengaging means has a leading end insertable between said one edge of said inserted cell and the side wall of said housing chamber and a tapered portion which is extended further integrally with said leading end and is capable of shifting said one edge of said inserted cell in the direction substantially perpendicular to the direction in which said cover is closed.

4. A cell housing device as set forth in claim 1, wherein said cover further includes an engaging member which is pressed against one end surface of said inserted cell when said cover is closed, thereby maintaining said inserted cell in a stationary state in said housing chamber.

5. A cell housing device as set forth in claim 1, wherein said cover further includes positioning means which is forced to contact with one end surface of said second cell inserted into said first housing portion in response to the closing operation of said cover, thereby displacing said second cell so as to adjust the housing position thereof.

6. A cell housing device for a camera comprising:
a housing chamber in which is housed selectively one of a plurality types of electrical cells whose terminals or electrodes are spaced apart from each other by different distance and at least which are different in length; and
electric contact establishment member comprising an electrical contact portion disposed within said housing chamber, a contact supporting portion supporting being displaced over a distance corresponding to the length of said cell inserted into said housing chamber so as to displace said electrical contact portion to the position of the electrode terminal of said inserted cell in response to the operation of inserting said cell into said housing chamber and an elastic spring portion for forcibly contacting said contact portion with said electrode or terminal of said inserted cell through said contact supporting portion.

7. A cell housing device as set forth in claim 6, wherein said elastic spring portion of said electrical contact establishment member comprises a torsion spring one end of which is securely anchored to the inner wall of said housing chamber; and
said contact supporting portion is in the form of a rod extended integrally with the other end of said torsion spring in the direction in which said contact supporting portion intersects a coil shaft, one end of said rod-shaped contact supporting portion terminating into said contact portion.

8. A cell housing device as set forth in claim 6, wherein said housing chamber includes a cover member which can open or close an opening of said housing chamber through which is inserted a cell; and
said electrical contact establishment member biases said inserted cell through said electrode or terminal toward said cover member.

9. A cell housing device for a camera comprising:
a housing chamber into which is selectively housed one of a plurality types of cells which are different at least in length and have electrodes or terminals spaced apart from each other by different distances;
an electrical contact capable of contacting in common with the electrode or terminal of any cell inserted into the housing chamber;
means for displacing said contact over a length corresponding to the length of the cell housed in said housing chamber in response to the operation for inserting a cell into said housing chamber; and
elastic spring means for forcibly contacting said electrical contact with said electrode or terminal.

10. A cell housing device as set forth in claim 9, wherein said elastic spring means comprises a torsion spring whose one end is securely anchored to the inner wall of said housing chamber; and
said contact displacing means in the form of a rod extended integrally from the other end of said torsion spring in the direction which said contact displacing means intersect a coil shaft, the leading end of said contact displacing means being terminated into said electrical contact.

11. A cell housing device as set forth in claim 9, further comprising a cover member which can open or close an opening of said housing chamber through which a cell is inserted into housing chamber; and
said elastic spring means biases said inserted cell through said electrical contact and said electrode or terminal toward said cover member.

* * * * *